United States Patent [19]

Yamaguchi et al.

[11] Patent Number: 4,730,586

[45] Date of Patent: Mar. 15, 1988

[54] FUEL INJECTION APPARATUS FOR INTERNAL COMBUSTION ENGINES

[75] Inventors: Susumu Yamaguchi; Hiroshi Ishiwata, both of Higashimatsuyama, Japan

[73] Assignees: Diesel Kiki Co., Ltd; Mitsubishi Jidosha Kogyo Kabushiki Kaisha, both of Tokyo, Japan

[21] Appl. No.: 875,949

[22] Filed: Jun. 19, 1986

[30] Foreign Application Priority Data

Jun. 21, 1985 [JP] Japan .................................. 60-134202

[51] Int. Cl.$^4$ .............................................. F02B 3/00
[52] U.S. Cl. ................................ 123/357; 123/357; 123/501; 123/479
[58] Field of Search ............... 123/500, 501, 502, 506, 123/479, 357, 359

[56] References Cited

U.S. PATENT DOCUMENTS

| | | | |
|---|---|---|---|
| 4,370,962 | 2/1983 | Hosaka | 123/479 |
| 4,395,905 | 8/1983 | Fujimoki | 123/357 |
| 4,425,889 | 1/1984 | Hachitani | 123/357 |
| 4,428,346 | 1/1984 | Hoshi | 123/479 |
| 4,491,112 | 1/1985 | Kanegae | 123/479 |
| 4,492,196 | 1/1985 | Oshizawa | 123/479 |
| 4,499,876 | 2/1985 | Yamamoto | 123/479 |
| 4,509,480 | 4/1985 | Kull | 123/479 |
| 4,534,328 | 8/1985 | Fisher | 123/479 |
| 4,541,380 | 9/1985 | Oshizawa | 123/479 |
| 4,630,588 | 12/1986 | Sagawa | 123/506 |

*Primary Examiner*—Ronald B. Cox
*Attorney, Agent, or Firm*—James Creighton Wray

[57] ABSTRACT

In a fuel injection apparatus for an internal combustion engine which has a fuel injection pump having a plunger and one control sleeve fitted on the plunger and capable of regulating both the fuel injection quantity and the timing of the beginning of fuel injection by the adjustment of the relative positional relationship therebetween, and a control unit for controlling the positional relationship in order to obtain the optimum fuel injection rate and fuel injection quantity, the apparatus comprises a detector for detecting any trouble occurring in the control system for regulating the position of the control sleeve and a limiting circuit for limiting the control operation by the control unit so that an excessive rise in the inner pressure of the cylinders in the internal combustion engine is prevented when the occurrence of the trouble is detected by the detector.

16 Claims, 4 Drawing Figures

FUEL INJECTION APPARATUS FOR INTERNAL COMBUSTION ENGINES

BACKGROUND OF THE INVENTION

The present invention relates to a fuel injection apparatus for an internal combustion engine, and more particularly to a fuel injection apparatus for an internal combustion engine employing a fuel injection pump having a variable pre-stroke mechanism, which fuel injection apparatus prevents damage to both the fuel injection pump and the internal combustion engine when trouble occurs in the control of the fuel injection pump.

The driving characteristics of an internal combustion engine can be improved by appropriate adjustment of the fuel injection rate. Because of this, in the prior art, there have been proposed various fuel injection pumps for internal combustion engines having a pre-stroke mechanism and enabling the fuel injection timing to be adjusted in addition to the fuel injection quantity, whereby the fuel injection rate can be set to a desired value (see, for example, Japanese Patent Application Disclosure No. 163169/84).

In an electronically controlled fuel injection apparatus which electronically controls injection quantity and injection rate and which uses this type of fuel injection pump, when there is a malfunction in the control circuit, it becomes impossible to detect the timing of the beginning of fuel injection. In other words, there is no way to obtain information on the state of regulation of the pre-stroke mechanism. Because of this, depending on the operating condition of the internal combustion engine at that time, the inner pressure of the cylinders of the internal combustion engine or the inner pressure of the injection pipes of the fuel injection pump may reach a greater value than is permissible. As a result, there is a high risk of damage to the internal combustion engine and the fuel injection pump. More specifically, when the amount of the pre-stroke is at its minimum due to a malfunction in the control system, the possibility of the inner pressure of the cylinders of the internal combustion engine being more than permissible occurs in the case where the speed of the internal combustion engine is high and the amount of fuel injection is great. On the other hand, when the amount of the pre-stroke reaches its maximum, the possiblity of the inner pressure of the injection pipes of the fuel injection pump being greater than permissible arises in the case where the speed of the internal combustion engine is high and the amount of fuel injection is great.

For eliminating the above-mentioned drawbacks, Japanese Patent Application Disclosure No. 63332/84 proposes an apparatus constructed so as to suppress the maximum fuel injection quantity when any trouble occurs in its control system. However, even if the maximum quantity of fuel injection is suppressed, the fuel injection timing will be in an advanced state at the minimum amount of pre-stroke, so that there is a danger of the internal combustion engine being damaged as a result of the inner pressure of the cylinders of the internal combustion engine becoming high.

SUMMARY OF THE INVENTION

It is an object of the present invention to provide an improved electronically controlled fuel injection apparatus for internal combustion engines, which is capable of regulating the amount of pre-stroke for determining the timing of the beginning of fuel pressurization.

It is another object of the present invention to provide an electronically controlled fuel injection apparatus for internal combustion engines in which damage to both the fuel injection pump and the internal combustion engine can be effectively prevented even when a malfunction occurs in the control system for controlling the amount of pre-stroke in the fuel injection pump.

According to the present invention, in a fuel injection apparatus for internal combustion engines which has a fuel injection pump having a plunger caused to carry out at least reciprocal movement in a predetermined pattern in a bore formed in a plunger barrel to pressurize fuel in the plunger barrel, and at least one control sleeve fitted on the plunger, whereby both the fuel injection quantity and the timing of the beginning of fuel injection can be regulated by the adjustment of the relative positional relationship between the control sleeve and the plunger, the apparatus comprises a first actuator for regulating the position of the control sleeve to regulate the fuel injection rate, a second actuator for regulating the position of the plunger to regulate the fuel injection quantity, and a control unit responsive to at least one signal indicating the operating condition of the internal combustion engine for drivingly controlling the first and second actuators in such a way that the optimum fuel injection rate and fuel injection quantity can be obtained at each instant. The apparatus further comprises a detecting means for detecting any trouble occuring in the control system for regulating the position of the control sleeve, and means for limiting the control operation by the control unit so that an excessive rise in the inner pressure of the cylinders in the internal combustion engine is prevented when the occurrence of the trouble is detected by the detecting means.

In the fuel injection pump, the operation is repeatedly carried out, in which the fuel is sucked into the barrel at the time the plunger is caused to move in the reverse direction and the sucked fuel is pressurized and supplied at the time the plunger is caused to move in the forward direction, once for every reciprocal operation of the plunger. The timing of the beginning of fuel pressurization is determined by the position of the control sleeve regulated by the first actuator, and at the same time as the pressurization of fuel, fuel is supplied under pressure from the fuel injection pump to the associated internal combustion engine. When the plunger moves in the forward direction and the positional relationship between the plunger regulated by the second actuator and the control sleeve is put into the predetermined state in which the control sleeve allows communication between the open end of a passage which is formed in the barrel and communicates with a high pressure chamber and a low pressure portion, the pressure in the high pressure chamber formed in the barrel is released and the supply of fuel under pressure is terminated.

The pattern of the reciprocal operation of the plunger is fixed, so that the adjustment of the fuel injection rate can be made by adjusting the timing of the beginning of fuel injection through adjustment of the pre-stroke quantity of the plunger using the control sleeve. The fuel injection quantity can be set to a desired value by adjusting the timing of the end of fuel injection, which can be carried out by adjusting the control sleeve actuated by the second actuator while taking into consideration the amount of pre-stroke at that time. The position-setting control of the control sleeve by the first and second actuators is carried out in accordance with the results of a calculation in the control unit.

When trouble of some sort arises in relation to the position-setting control system for the control sleeve and the occurrence of this trouble is detected by the detecting means, the position of the control sleeve is limited by the first actuator in such a way that the inner pressure in the cylinders of the engine does not rise excessively. Thus, the inner pressure in the cylinders of the internal combustion engine never rises above the permissiable value, so that the cylinders of the internal combustion engine, which are apt to be damaged by excessive pressure, can be sufficiently protected.

The invention will be better understood and other objects and advantages thereof will be more apparent from the following detailed description of preferred embodiments with reference to the accompanying drawings.

DESCRIPTION OF THE PREFERRED EMBODIMENTS

Figure 1:
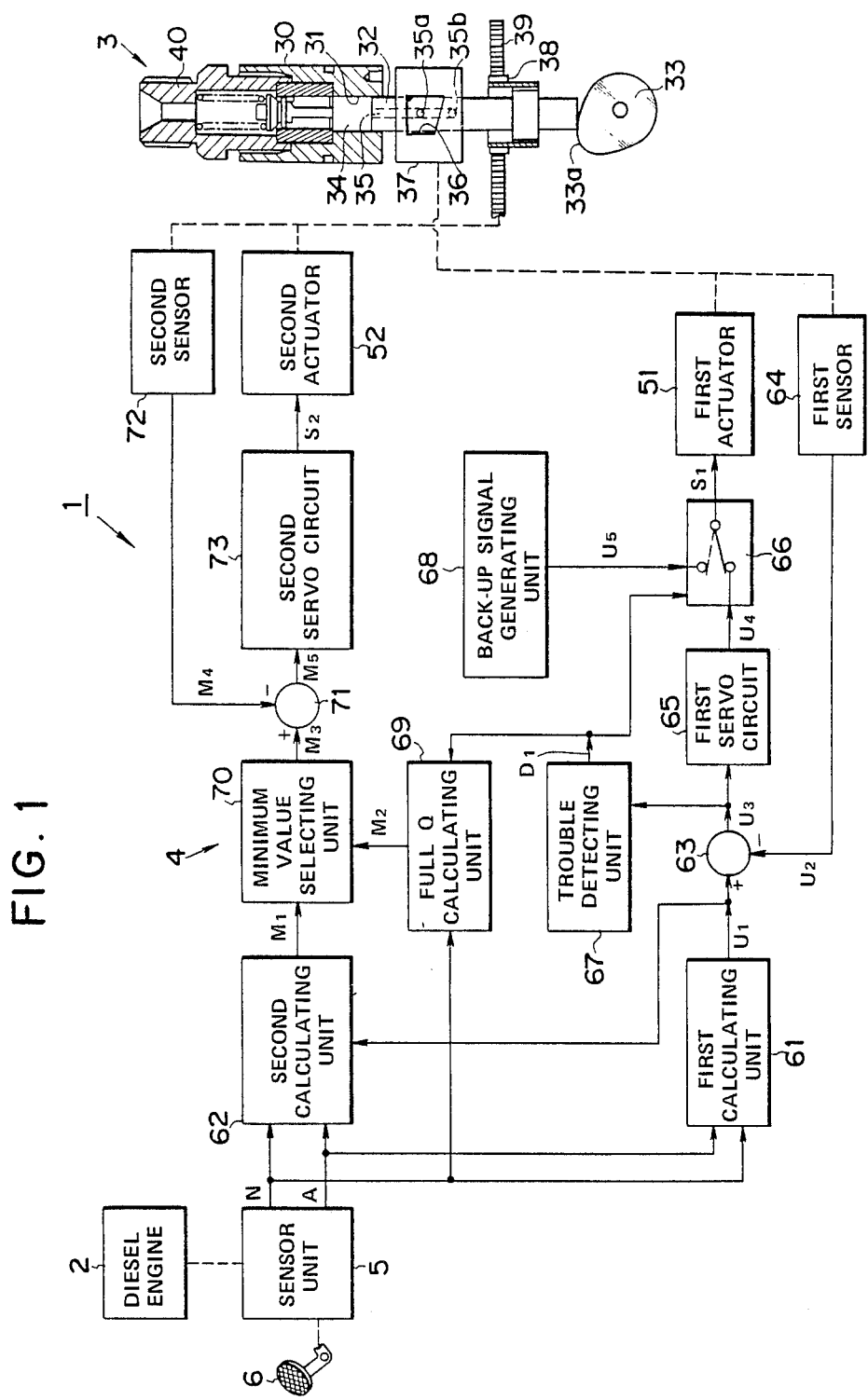
FIG. 1 is a block diagram with a sectional view of a part of a fuel injection pump showing an embodiment of a fuel injection apparatus for internal combustion engines according to the present invention.

FIG. 1 is a view schematically illustrating an embodiment of a fuel injection apparatus for internal combustion engines according to the present invention. The fuel injection apparatus 1 is provided with a fuel injection pump 3 for injecting a supply of fuel to a diesel engine 2, and a control unit 4 for electronically controlling the injection quantity and the injection rate of the fuel supplied to the diesel engine 2 from the fuel injection pump 3.

In the embodiment shown in FIG. 1, the fuel injection pump, in which a front end portion of a plunger 32 is inserted into a hole 31 formed in a barrel 30 and the rear end surface of the plunger 32 is in contact under pressure through an intervening spring (not shown) with a cam surface $33_a$ of a cam 33 which is rotated by the diesel engine 2. Consequently, when the cam 33 rotates, the plunger 32 performs reciprocal movement in the direction of its axis in a fixed pattern according to the cam profile of the cam 33.

A fuel passage 35 is defined in the plunger 32 and the fuel passage 35 is communicated with a high pressure chamber 34 which is a space formed by the plunger 32 and the barrel 30 for pressurizing fuel. Holes $35_a$ and $35_b$ communicating with the fuel passage 35 are provided on the peripheral surface of the plunger 32 at a predetermined interval.

In order to make possible the regulation of the fuel injection quantity and the fuel injection rate by the regulation of the opening/closing timing of the holes $35_a$ and $35_b$ during the reciprocal operation of the plunger 32, a control sleeve 37 having a window 36 is fitted on the plunger 32. The control sleeve 37 is guided by a guide member (not shown) so as to move only in the direction of its axis and to not rotate. On the other hand, the plunger 32 is connected with a conventional adjusting mechanism consisting of a pinion 38 connected to the plunger 32 and a rack 39 associated with the pinion 38. Thus the rotational position of the plunger 32 can be adjusted freely by the operation of the rack 39.

In the fuel injection pump 3 of the aforesaid construction, the timing at which the hole $35_a$ exposed through the window 36 is closed up by the control sleeve 37 can be regulated by moving the control sleeve 37 in its axial direction, while the timing of at which the hole $35_b$ becomes exposed through the window 36 can be adjusted by rotating the plunger 32. Since, as mentioned above, the pattern of reciprocal movement of the plunger 32 is fixed by the cam profile of the cam 33, the fuel injection rate can be set to a desired value by regulating the timing at which the hole $35_a$ is closed; that is, by regulating the timing of the beginning of fuel injection. Further, the timing of the end of fuel injection can be set as desired by regulating the timing at which the hole $35_b$ becomes exposed through window 36.

The fuel which has been pressurized to a predetermined degree is supplied under pressure to the internal combustion engine from a delivery valve 40 provided on the front end portion of the barrel 30.

The control sleeve 37 and the rack 39 are connected to first and second actuators 51, 52, respectively, which are respectively controlled in accordance with first and second control signals $S_1$ and $S_2$ output from the control unit 4.

The first actuator 51 is connected to the control sleeve 37 to control the position of the control sleeve 37, making it possible to set the timing of the beginning of fuel injection at a desired value. The second actuator 52 is connected to the rack 39 to control the position of the rack 39 so that the timing of the end of fuel injection can be set. These actuators 51 and 52 are controlled on the basis of the result of the control calculation of the control unit 4 in such a way that both the fuel injection rate and the fuel injection quantity are made optimum for the operating condition of the diesel engine 2 at each instant.

In the following, the construction of the control unit 4 will be described. The control unit 4 receives a speed signal N indicating the rotational speed of the diesel engine 2 and an acceleration signal A indicating the amount of operation of an accelerator pedal 6 from a sensor unit 5 which includes various conventional sensors for detecting the operating condition of the diesel engine 2, and the speed signal N and the accelerator signal A are input to first and second calculating units 61 and 62, respectively.

The first calculating unit 61 calculates the optimum fuel injection rate corresponding to the operating condition of the diesel engine at each instant on the basis of the speed signal N and the acceleration signal A, and outputs a first target position signal $U_1$ which indicates the required position of the control sleeve 37 for obtaining the fuel injection rate obtained by the mentioned calculation. The first target position signal $U_1$ is input to an adder 63 wherein the target position signal $U_1$ is added to a first actual position signal $U_2$ from a first sensor 64 for detecting the position of the control sleeve 37 at each instant, in accordance with the polarity shown in FIG. 1. The first actual position signal $U_2$ indicates the position of the control sleeve 37 at each instant, and a first error signal $U_3$ which indicates the difference between the target position and the actual position of the control sleeve 37 is output from the adder 63 and input to a first servo circuit 65. The first servo circuit 65 is responsive to the first error signal $U_3$ and outputs a driving signal $U_4$ for driving the first actuator 51 so as to reduce the difference indicated by the first error signal $U_3$ to zero. This driving signal $U_4$ is derived through a switch 66 and applied to the first actuator 51 as the first control signal $S_1$.

The first error signal $U_3$ is also input to a trouble detecting unit 67 for detecting whether any trouble has arisen in the control system for the control sleeve 37. In the trouble detecting unit 67, it is checked whether or not the level of the first error signal $U_3$ has been continuously maintained at more than a predetermined value for longer than a predetermined period. In the case where the level of the first error signal $U_3$ has been continuously maintained greater than the predetermined value for a period longer than the predetermined period, the trouble detecting unit 67 decides that there is some trouble in the control system and outputs a trouble detection signal $D_1$. This trouble detection signal $D_1$ is applied as a switch control signal to the switch 66 which is normally positioned as shown by the solid line, and the switch 66 is changed-over as shown by the broken line in response to the application of the trouble detection signal $D_1$. As a result, when any trouble in the control system is detected, a back-up driving signal $U_5$ from back-up signal generating unit 68 is applied instead of the driving signal $U_4$ as the first control signal $S_1$ to the first actuator 51. The back-up driving signal $U_5$ is a signal for setting the position of the control sleeve 37 in such a way that the amount of the pre-stroke determined by the control sleeve 37 is set at its maximum value. Therefore, when any trouble occurs in the control system for controlling the fuel injection rate, the control sleeve 37 is set in the position which maximizes the pre-stroke of the fuel injection pump 3.

In response to the speed signal N, accelerator signal A and the first target position signal $U_1$, the second calculating unit 62 performs a map calculation for obtaining the optimum amount of fuel injection for the operating condition of the diesel engine 2 at each instant, and a signal indicating the position of the plunger 32 which is required for obtaining the calculated amount of fuel injection is output as a second target position signal $M_1$ from the second calculating unit 62. A full Q calculating unit 69 is responsive to the speed signal N, and calculates and outputs a full Q signal $M_2$ which indicates the maximum injection quantity which is in accordance with the maximum fuel injection amount characteristic which is a function of the engine speed at each instant. The full Q signal $M_2$ and the second target position signal $M_1$ are input to a minimum value selecting unit 70, wherein a signal which indicates the smaller fuel injection quantity of the two quantities is output as a target injection amount signal $M_3$.

The target injection amount signal $M_3$ is input to an adder 71 wherein it is added to a second actual position signal $M_4$ from a second sensor 72 which detects the actual position of the rack 39 at each instant, in accordance with the polarity shown in FIG. 1. The second actual position signal $M_4$ indicates the actual position of the rack 39 at each instant. The adder 71 outputs a second error signal $M_5$ which indicates the difference between the target position and the actual position of the rack 39 and the second error signal $M_5$ is input to a second servo circuit 73. The second servo circuit 73 is responsive to the second error signal $M_5$ and outputs a driving signal for driving the second actuator 52 in such a way that the difference indicated by the second error signal $M_5$ is reduced to zero. This driving signal is applied as the second control signal $S_2$ to the second actuator 52.

The trouble detection signal $D_1$ is input to the full Q calculating unit 69 in order to lower the level of the maximum injection quantity when a trouble occurs in the system for controlling the fuel injection rate. In response to the output of the trouble detection signal $D_1$, the full Q calculating unit 69 outputs a full Q signal $M_2$ in accordance with a fuel injection quantity characteristic which is lower by a predetermined level as compared with the normal maximum fuel injection quantity characteristic mentioned above.

As a result, when a trouble occurs in the control system for the fuel injection rate, the maximum value of the fuel injection quantity is suppressed to a lower level than that during normally operating condition.

According to the above-mentioned construction, the position of the control sleeve 37 is feedback-controlled by the control system to which the first actual position signal $U_2$ from the first sensor 64 is input as a feedback signal, so that it is possible to obtain a fuel injection rate according to the result of the calculation in the first calculating unit 61. On the other hand, the rotational position of the plunger 32 is feedback-controlled by the control system to which the second actual position signal $M_4$ from the second sensor 72 is input as a feedback signal, so that it is possible to obtain a fuel injection quantity according to the results of the calculation in the second calculating unit 62.

When some kind of trouble occurs in the control system for controlling the fuel injection rate, the trouble detection signal $D_1$ is output and the value of the maximum quantity of fuel injection indicated by the full Q signal $M_2$ produced by the full Q calculating unit 69 becomes low, so that the maximum quantity of fuel injection is suppressed. At the same time, the switch 66 is switched over as shown by the broken line, and the back-up driving signal $U_5$ is output as the first control signal instead of the driving signal $U_4$, and the control sleeve 37 is positioned so that the amount of the pre-stroke of the plunger 32 becomes maximum.

In this way, not only is the injection rate kept low, the maximum quantity of fuel injection is also kept low, so that the inner pressure in the cylinders of the engine is suppressed below the maximum permissible even when the engine speed becomes high, whereby damage to the diesel engine 2 can be reliably prevented.

In this case, when the amount of pre-stroke is maximized, the inner pressure in the injection pipe of the injection pump increases in accordance with the increase in the engine speed. However, since the injection pump has good high-pressure resistance as compared with the internal combustion engine, neither the injection pump nor the diesel engine will be damaged.

The function of the control unit 4 shown in FIG. 1 can also be realized by the execution of a predetermined control program in a microcomputer.

Figure 2:
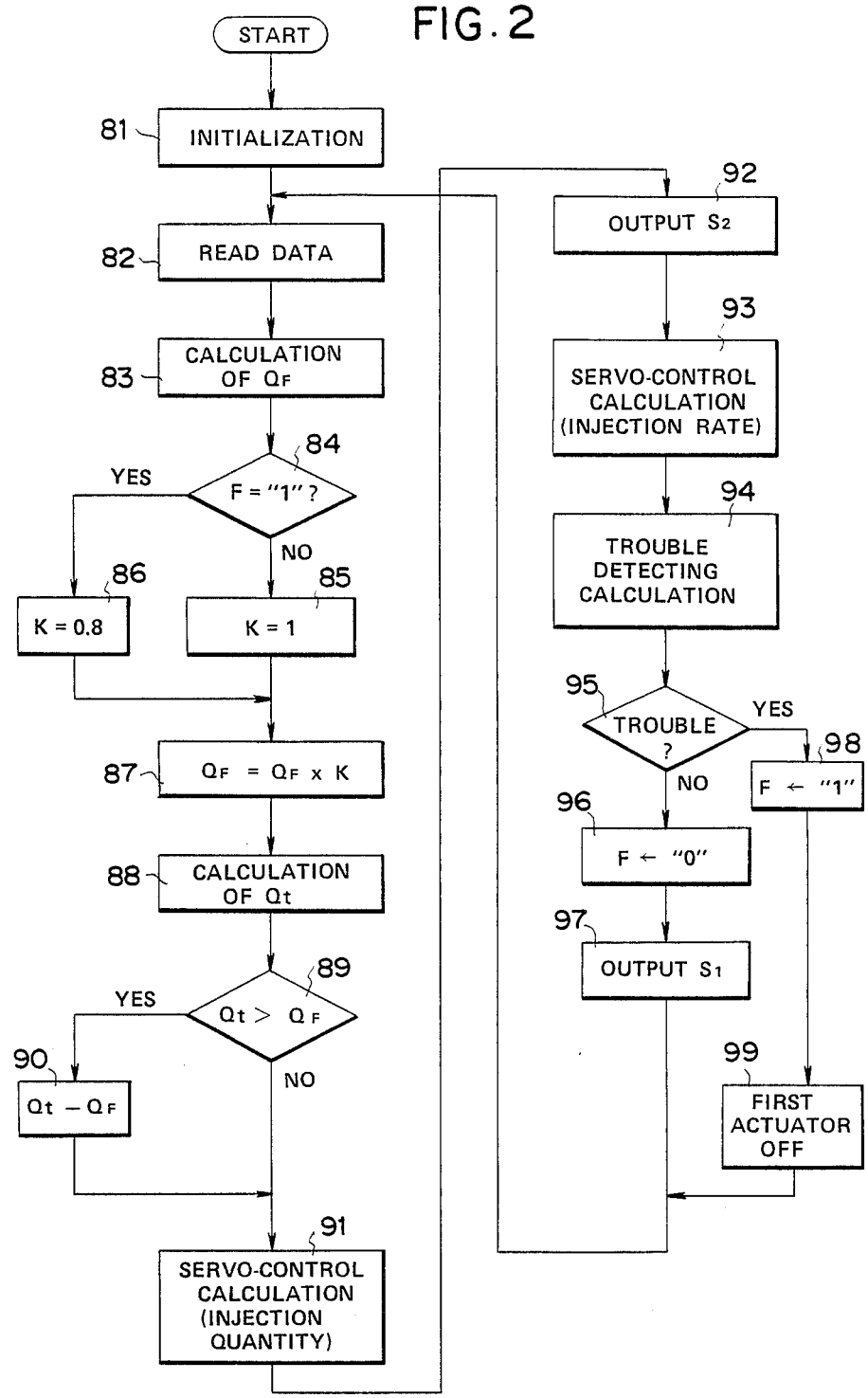
FIG. 2 is a flowchart showing a control program for realizing a similar function as that of the control unit shown in FIG. 1 by the use of a microcomputer.

FIG. 2 is a flowchart showing a control program for realizing a similar function as that of the control unit 4 shown in FIG. 1 by the use of a microcomputer. In the following, this flowchart will be explained.

When the execution of the program is started, the program is initialized in step 81 and the various data applied from the sensor unit 5 is read-in in step 82. The operation then moves to step 83 in which the calculation of the maximum fuel injection quantity $Q_F$ corresponding to the operating condition of the engine at that time is performed based on the above-mentioned data. After this, the operation moves to step 84, in which the discrimination of flag F which indicates whether or not any trouble has occurred in the control system for controlling the fuel injection rate is made. This flag F is set in accordance with the results of the decision in step 95 to be explained later where it is discriminated whether any trouble has occurred or not. However, in this case, since the flag F is still in a "0" state following initialization step 81, the result of the determination in step 84 becomes NO. Accordingly, the procedure moves on to step 85 wherein the constant K is set to 1. In the case where the result of the determination in step 84 is YES, the procedure moves on to step 86 wherein the constant K is set to 0.8.

In either case, the procedure moves on to step 87 after the value of the constant K is set, and in step 87, the value of the maximum quantity of fuel injection obtained in step 83 and the value K at that instant (1 or 0.8) are multiplied. The result of this calculation is set as the maximum quantity $Q_F$ of fuel injection at that instant. Accordingly, in the case where there is no trouble in the control system for the fuel injection rate, the maximum quantity of fuel injection obtained in step 83 is set without change as the maximum quantity of fuel injection at that time. On the other hand, in the case where some sort of trouble has arisen in the control system for the fuel injection rate, the value of the maximum quantity of fuel injection at that instant is a value 0.8 times the quantity of fuel injection obtained in step 83. In other words, when trouble arises in the control system for the fuel injection rate, the maximum quantity of fuel injection is kept lower than the normal value.

In step 88, the optimum quantity of fuel injection which corresponds with the operating condition of the engine at each instant is calculated as a target fuel injection quantity $Q_t$ based on the read-in data, and a comparison in magnitude between the maximum quantity of fuel injection $Q_F$ and the target quantity $Q_t$ of fuel injection is executed so as to find out which is greater. In the case where $Q_t > Q_F$, the operation moves to step 90 in which the content of $Q_t$ is changed to $Q_F$ while in the case where $Q_t \leq Q_F$, the operation moves to step 91 without the change of the contents of $Q_t$. In step 91, a servo-control calculation, which is necessary for obtaining the value $Q_t$, is performed on the basis of the target fuel injection quantity $Q_t$ obtained as mentioned above, and the first and second actual position signals $U_2$ and $M_4$ at each instant. On the basis of the result, the second control signal $S_2$ for setting the rack 39 to a desired position is output in step 92.

The procedure then moves to step 93, in which a servo-control calculation is performed on the basis of the various input data in order to obtain the optimum fuel injection rate corresponding to the operating condition of the engine at that instant. In step 94, the magnitude of the difference between the target fuel injection rate obtained in the servo-control calculation in step 93 and the actual fuel injection rate shown by the input data, and the period over which this magnitude of difference is maintained are measured. Based on the result of this measurement, a discrimination is made in step 95 as to whether there is trouble in the fuel injection rate control system. This discrimination is made on the basis of whether or not the difference obtained in step 94 has been maintained for more than the predetermined period, and is greater than the predetermined value. In the case where the difference has been maintained for longer than the predetermined period and is greater than the predetermined value, it is discriminated that some kind of trouble has arisen in the control system, and the result of the discrimination in step 95 becomes YES. On the other hand, in the case where the difference is not maintained for longer than the predetermined period or the value is not more than the predetermined value, it is discriminated that the control system is functioning normally, and the result of the discrimination in step 95 becomes NO.

When the result of the discrimation in step 95 is NO, flag F is reset in step 96, and the first control signal $S_1$, which is for driving the first actuator 51 so as to obtain the desired fuel injection rate according to the results of the calculation in step 93, is output in step 97. After this, the operation returns to step 82. On the other hand, when the result of the discrimination in step 95 is YES, after the flag F is set in step 98, the driving current to the first actuator 51 is cut off in step 99. Accordingly, the control sleeve 37 is set in position by the force of a bias spring (not shown) so as to obtain the maximum quantity of the pre-stroke.

In this way, when trouble occurs in the control system for the fuel injection rate, the maximum quantity of fuel injection is kept down, and moreover, the control sleeve 37 is positioned in such a way that the quantity of the pre-stroke is maximized. As a result, even if there is trouble in the control system for the fuel injection rate, the pressure in the cylinders of the diesel engine will be prevented from becoming higher than the allowable value, and the diesel engine will be prevented from assuming a condition in which it can be damaged.

In addition, in this embodiment, in the case where trouble has occurred in the control system for controlling the injection rate, the maximum quantity of fuel injection is lowered and the timing of the beginning of fuel injection is set so as to be delayed as much as possible, whereby an excessive rise in the inner pressure of the cylinders of the internal combustion engine is effectively prevented. However, the present invention is not limited to this embodiment and can employ any other arrangement for preventing the excessive rise in the inner pressure of the cylinders of the internal combustion engine.

Figure 3:
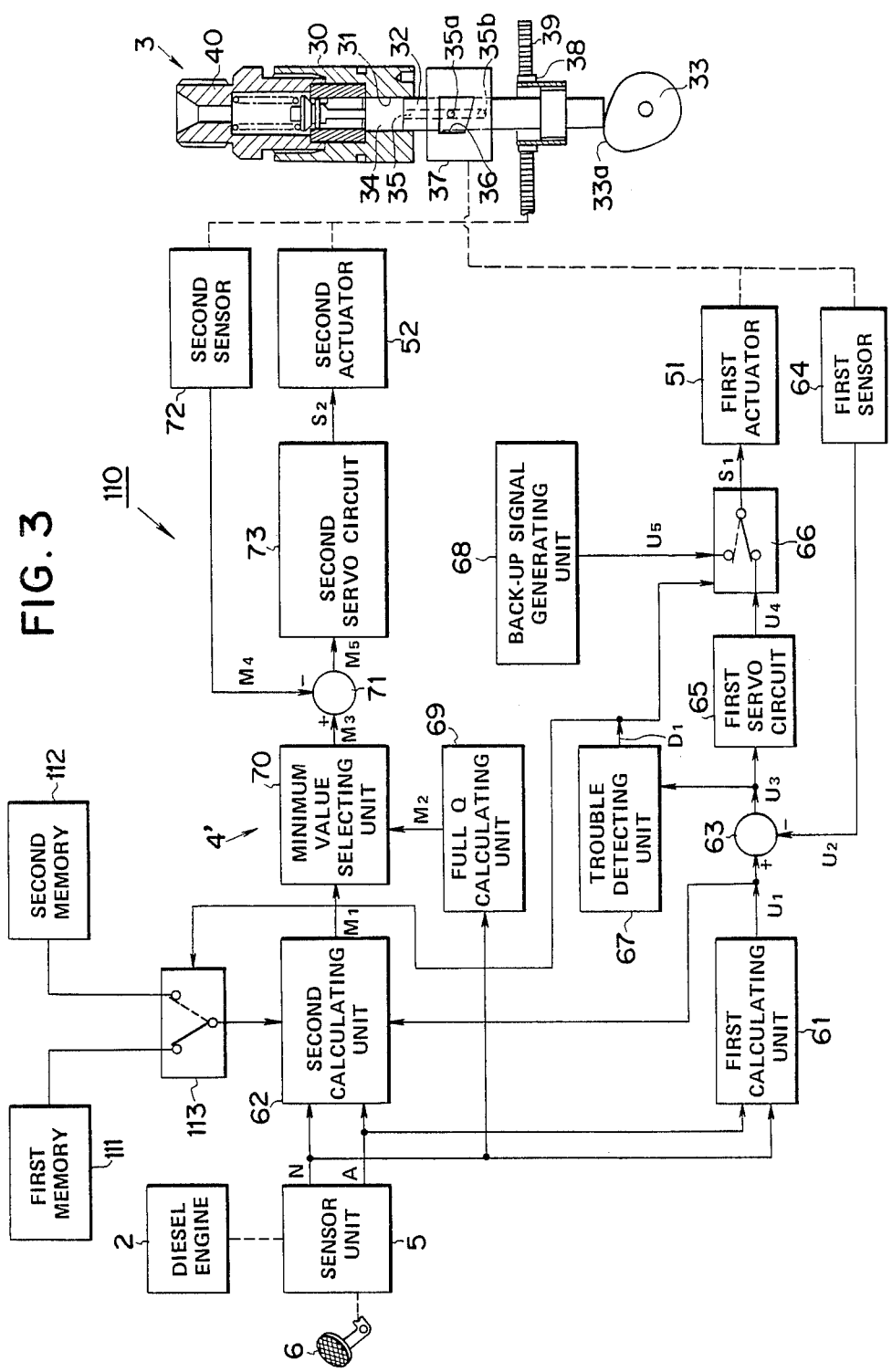
FIG. 3 is a block diagram with a sectional view of a part of a fuel injection pump showing another embodiment of a fuel injection apparatus for internal combustion engines according to the present invention.

FIG. 3 is a block diagram of another embodiment of a fuel injection apparatus for an internal combustion engine according to the present invention. The fuel injection apparatus 110 for internal combustion engines shown in FIG. 3 is different from the embodiment shown in FIG. 1 only in that the control unit 4' is constituted so as to keep the maximum rotation speed of the diesel engine 2 low in the case where trouble has arisen in the control system for controlling the injection rate, and the other constituent elements are identical to those shown in FIG. 1. Consequently, the portions in FIG. 3 which correspond with the various portions of FIG. 1 are denoted by the same numerals and description thereof will not be given here.

The second calculating unit 62 of the fuel injection apparatus 110 is also constituted in such a way that the map calculation is carried out in response to the speed signal N, acceleration signal A and the first target signal $U_1$ for obtaining the optimum quantity of fuel injection corresponding to the operating condition of the diesel engine 2 at each instant. The map data required for this map calculation is stored in a first memory 111 and a second memory 112. The first memory 111 has first map data which is used for the calculation of the target quantity of fuel injection in the case where the control system for controlling the fuel injection rate is operating normally, while the second memory 112 has second map data used for the calculation of the target quantity of fuel injection in the case where trouble has occurred in the control system for controlling the fuel injection rate. The second map data is determined so that the maximum speed of the diesel engine 2 is kept lower than that determined by the calculation according to the first map data.

The second calculating unit 62 is able to selectively receive either the output from the first memory 111 or the output from the second memory 112 via a selecting switch 113 which operates in response to the trouble detection signal $D_1$. When there is no trouble in the control system for controlling the fuel injection rate, the selecting switch 113 is switched-over as shown by the solid line, and the second calculating unit 62 is connected to the first memory 111. On the other hand, when trouble does arise in the control system for controlling the fuel injection rate, the selecting switch 113 is switched-over as shown by the broken line, and the second calculating unit 62 is connected to the second memory 112. As a result, when trouble occurs in the control system for controlling the fuel injection rate, the calculation for obtaining the target quantity of fuel injection is performed on the basis of the second map data stored in the second memory 112. Therefore, the maximum speed of the diesel engine 2 is kept at a lower value than in the case in which the calculation of the target quantity of fuel injection is performed on the basis of the first map data.

In the embodiment in FIG. 3, the maximum speed of the diesel engine 2 is restricted as a result of the map data, which is used for the calculation in the second calculating unit 62, being altered, so that the value indicated by the full Q signal $M_2$ calculated by the full Q calculating unit 69 is not lowered. Consequently, regardless of the result of the detection in the trouble detecting unit 67, a full Q signal $M_2$ which indicates the predetermined maximum injection quantity is always further output.

According to this type of construction, when some kind of trouble arises in the control system for controlling the fuel injection rate and the trouble detecting signal $D_1$ is output, the second calculating unit 62 calculates the target quantity of fuel injection based on the second map data stored in the second memory 112 and consequently, the maximum speed of the diesel engine 2 is kept low. At the same time, the switch 66 is switched-over as shown by the broken line, and the back-up signal $U_5$ is output as the first control signal $S_1$ instead of the driving signal $U_4$, and the control sleeve 37 is positioned in such a position that the pre-stroke quantity of the plunger 32 is maximized.

As described above, as the fuel injection rate is kept low and the maximum speed of the diesel engine 2 is also kept low, the engine speed will not become too high and the inner pressure of the cylinders of the engine is kept below the allowable pressure, and the prevention of damage to the diesel engine 2 is ensured.

Figure 4:
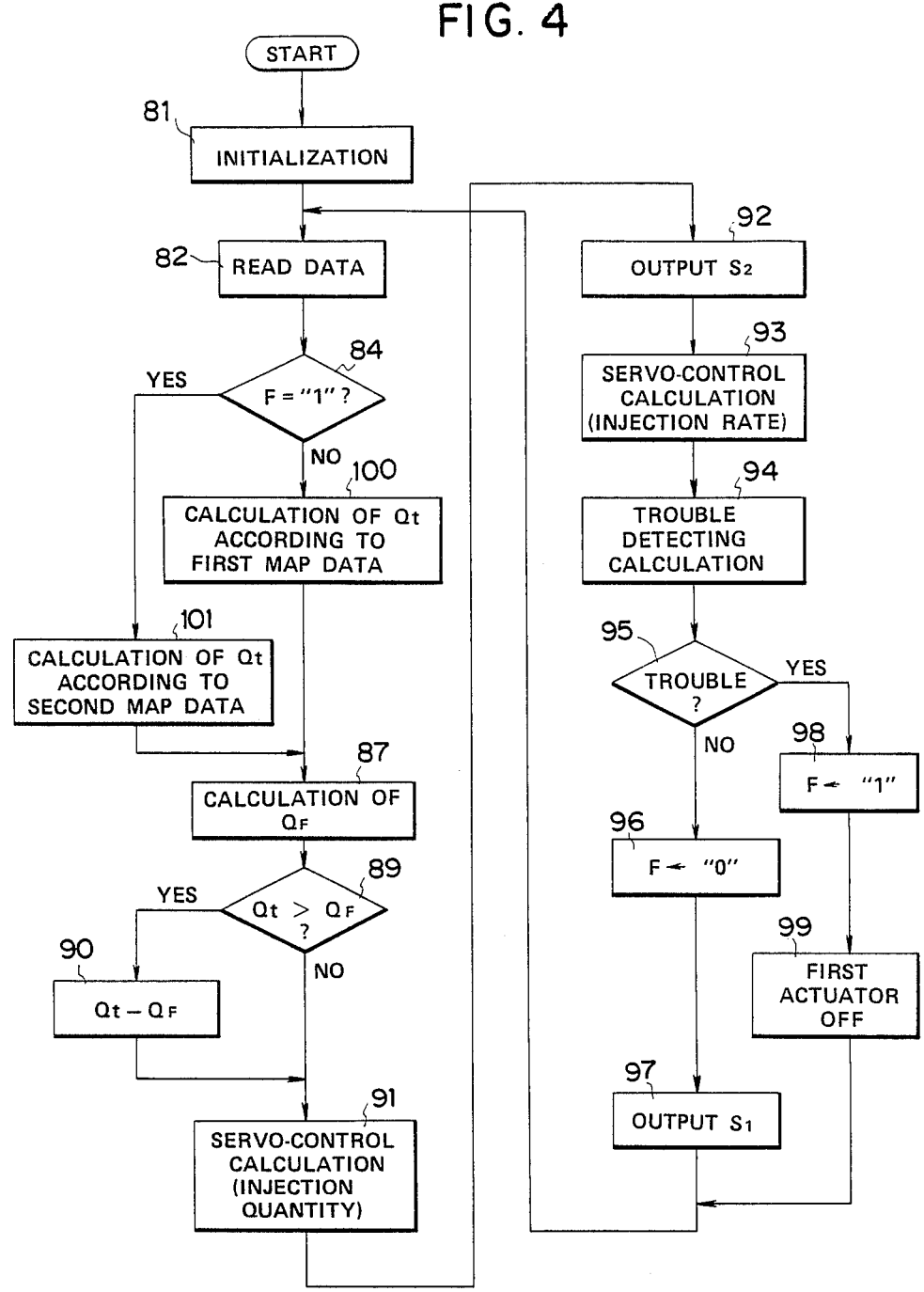
FIG. 4 is a flowchart showing a control program for realizing a similar function as that of the control unit shown in FIG. 3 by the use of a microcomputer.

FIG. 4 is a flowchart showing an example of a control program for realizing a similar function to that of the control unit 4' shown in FIG. 3 with the use of a microcomputer.

With this program, after the initialization in step 81, various kinds of data supplied from the sensor unit 5 is read-in in step 82. After this, the operation moves to step 84 wherein the state of flag F which shows whether or not some trouble has arisen in the control system for controlling the fuel injection rate is made, is discriminated. This flag F is set in accordance with the result of the determination in step 95 which discriminates the occurrence of trouble. In the present case, the flag F has been left in the "0" state which was set in the initialization step 81, so that the result of the determination in step 84 becomes No. In this case, the procedure moves to step 100, in which the target quantity $Q_F$ of fuel injection is calculated based on the first map data. If the result of the determination in step 84 is YES, the procedure moves to step 101 wherein the target quantity $Q_F$ of fuel injection based on the second map data is calculated. After the target quantity $Q_F$ of fuel injection has been calculated in step 100 or 101, the maximum quantity $Q_F$ of fuel injection is calculated in step 87. The following steps 89 through to 99 are the same as the corresponding steps in FIG. 2

Although in each of the embodiments mentioned above, description is given for the case where an in-line type fuel injection pump is used, the present invention is not limited to a fuel injection apparatus which uses an in-line type fuel injection pump and is equally applicable to a fuel injection apparatus using a fuel injection pump capable of regulating the pre-stroke quantity.

We claim:

1. A fuel injection apparatus for internal combustion engines, comprising:
   a fuel injection pump which has a plunger caused to carry out a least reciprocal movement in a predetermined pattern in a bore formed in a plunger barrel to pressurize fuel in the plunger barrel and at least one control sleeve fitted on the plunger, and is capable of regulating both the fuel injection quantity and the timing of the beginning of fuel injection by adjustment of the relative positional relationship between the control sleeve and the plunger;
   a first actuator for regulating the position of the control sleeve to regulate the fuel injection rate;
   a second actuator for regulating the position of the plunger to regulate the fuel injection quantity;
   a first means responsive to at least one condition signal indicating the operating condition of the internal combustion engine for drivingly controlling said first and second actuators in such a way that the optimum fuel injection rate and fuel injection quantity can be obtained at each instant;
   a detecting means for detecting any trouble occurring in the control system for regulating the position of the control sleeve; and
   a second means for limiting the control operation by said first means so that an excessive rise in the inner pressure of the cylinders in the internal combustion engine is prevented when the occurrence of trouble is detected by the detecting means,
   wherein said first means has a first control system responsive to at least the condition signal for feedback controlling the position of the control sleeve so as to obtain the optimum fuel injection rate, and a second control system responsive to at least the condition signal for feed-back controlling the position of the plunger so as to obtain the optimum fuel injection quantity, and wherein the first control system has a first calculating means responsive to at least the condition signal for calculating and outputting a first target position signal indicating the optimum position of the control sleeve, a first sensor for producing a first actual position signal indicating the actual position of the control sleeve, means responsive to the first target position signal and the first actual position signal for producing a first error signal relating to a first difference between the target position and the actual position of the control sleeve, and means responsive to the first error signal for producing a first signal for driving the first actuator so as to reduce the first difference to zero.

2. A fuel injection apparatus for internal combustion engines, comprising:

a fuel injection pump which has a plunger caused to carry out at least reciprocal movement in a predetermined pattern in a bore formed in a plunger barrel to pressurize fuel in the plunger barrel and at least one control sleeve fitted on the plunger, and is capable of regulating both the fuel injection quantity and the timing of the beginning of fuel injection by adjustment of the relative positional relationship between the control sleeve and the plunger;

a first actuator for regulating the position of the control sleeve to regulate the fuel injection rate;

a second actuator for regulating the position of the plunger to regulate the fuel injection quantity;

a first means responsive to at least one condition signal indicating the operating condition of the internal combustion engine for drivingly controlling said first and second actuators in such a way that the optimum fuel injection rate and fuel injection quantity can be obtained at each instant;

a detecting means for detecting any trouble occurring in the control system for regulating the position of the control sleeve; and a second means for limiting the control operation by said first means so that an excessive rise in the inner pressure of the cylinders in the internal combustion engine is prevented when the occurrence of trouble is detected by the detecting means, wherein said first means has a first control system responsive to at least the condition signal for feed-back controlling the position of the control sleeve so as to obtain the optimum fuel injection rate, and a second control system responsive to at least the condition signal for feed-back controlling the position of the plunger so as to obtain the optimum fuel injection quantity, and a full Q calculating means for calculating the maximum amount of fuel injection at each instant in response to at least the condition signal, the maximum amount of fuel injection controlled by the second control system being limited by the result of the calculation by the full Q calculating means.

3. An apparatus as claimed in claim 2 wherein the first control system has a first calculating means responsive to at least the condition signal for calculating and outputting a first target position signal indicating the optimum position of the control sleeve, a first sensor for producing a first actual position signal indicating the actual position of the control sleeve, means responsive to the first target position signal and the first actual position signal for producing a first error signal relating to a first difference between the target position and the actual position of the control sleeve, and means responsive to the first error signal for producing a first signal for driving the first actuator so as to reduce the first difference to zero.

4. An apparatus as claimed in claim 1 wherein the second control system has a second calculating means responsive to at least the condition signal and the first target position signal for calculating and outputting a second target position signal indicating the optimum rotational position of the plunger, a second sensor for producing a second actual position signal indicating the actual rotational position of the plunger, means responsive to the second target position signal and the second actual position signal for producing a second error signal relating to a second difference between the target rotational position and the actual rotational position of the plunger, and means responsive to the second error signal for producing a second signal for driving the second actuator so as to reduce the second difference to zero.

5. An apparatus as claimed in claim 1 wherein said detecting means is responsive to the first error signal and detects whether or not trouble has arisen in the first control system.

6. An apparatus as claimed in claim 5 wherein said detecting means discriminates the presence of trouble depending on whether or not the level of the value of the error signal is continuously maintained higher than a prescribed level for more than a predetermined period.

7. An apparatus as claimed in claim 1 wherein said second means is for suppressing the maximum amount of fuel injection when the occurrence of trouble is detected by said detecting means.

8. An apparatus as claimed in claim 1 wherein said second means is for suppressing the maximum speed of the internal combustion engine when the occurrence of trouble is detected by said detecting means.

9. An apparatus as claimed in claim 4, further comprising a full Q calculating means for calculating the maximum amount of fuel injection at each instant in response to at least the condition signal, the maximum amount of fuel injection controlled by the second control system being limited by the result of the calculation by the full Q calculating means.

10. An apparatus as claimed in claim 9 wherein the condition signal is a signal indicating the speed of the internal combustion engine at each instant.

11. An apparatus as claimed in claim 9 wherein the full Q calculating means is responsive to the output of said detecting means and the maximum amount of fuel injection determined by the full Q calculating means is changed so as to be lowered when the occurrence of trouble is detected by said detecting means.

12. An apparatus as claimed in claim 1 wherein the first control system further comprises a back-up signal generating means for producing a back-up signal and means for applying the back-up signal to the first actuator instead of the first signal in response to the detection of trouble by said detecting means, whereby the position of the control sleeve is controlled in such a way that the fuel injection rate is minimized when trouble occurs.

13. An apparatus as claimed in claim 4 wherein the second calculating means is responsive to the output of said detecting means and the second target position signal is determined in such a way that the maximum engine speed in the case where trouble is detected by said detecting means is kept lower than that in the case where no trouble is detected by said detecting means.

14. An apparatus as claimed in claim 4 wherein the second control system further comprises a first memory for storing first map data for calculating the target value for normal condition of the first control system in the second calculating means, a second memory for storing a second map data for calculating the target value for abnormal condition of the first control system in the second calculating means, and means responsive to the output of said detecting means for selectively inputting the output of the first or second memory to the second calculating means, whereby the maximum engine speed in the case where trouble is detected by said detecting means is kept lower than that in the case where no trouble is detected by said detecting means.

15. An apparatus as claimed in claim 2 wherein the condition signal is a signal indicating the speed of the internal combustion engine at each instant.

16. An apparatus as claimed in claim 2 wherein the full Q calculating means is responsive to the output of said detecting means and the maximum amount of fuel injection determined by the full Q calculating means is changed so as to be lowered when the occurrence of trouble is detected by said detecting means.

* * * * *